United States Patent [19]

Kulprathipanja et al.

[11] Patent Number: 6,007,724
[45] Date of Patent: Dec. 28, 1999

[54] METHOD FOR TREATING A LIQUID STREAM CONTAMINATED WITH AN IODINE-CONTAINING COMPOUND USING A SOLID ABSORBENT COMPRISING A METAL PHTHALOCYANINE

[75] Inventors: Santi Kulprathipanja, Inverness; Bipin V. Vora, Naperville; Yan Li, Bolingbrook, all of Ill.

[73] Assignee: UOP LLC, Des Plaines, Ill.

[21] Appl. No.: 09/216,767

[22] Filed: Dec. 21, 1998

[51] Int. Cl.$^6$ ..................................................... B01D 15/00
[52] U.S. Cl. ........................ 210/670; 210/673; 210/679; 210/683; 210/690; 562/608
[58] Field of Search ..................... 210/679, 683, 210/690, 691, 670, 673; 502/163; 562/608

[56] References Cited

U.S. PATENT DOCUMENTS

| | | | |
|---|---|---|---|
| 3,029,202 | 4/1962 | Brown | 502/163 |
| 3,658,467 | 4/1972 | Maeck | 23/25 |
| 3,702,886 | 11/1972 | Argauer et al. | 423/328 |
| 3,769,329 | 10/1973 | Paulik et al. | 260/488 |
| 4,072,630 | 2/1978 | Douglas | 502/163 |
| 4,088,737 | 5/1978 | Thomas et al. | 423/240 |
| 4,615,806 | 10/1986 | Hilton | 210/663 |
| 4,623,638 | 11/1986 | Hayatsu et al. | 210/679 |
| 4,735,786 | 4/1988 | Inoue et al. | 423/240 |
| 4,913,850 | 4/1990 | Puppe et al. | 252/630 |
| 5,075,084 | 12/1991 | Wilhelm et al. | 423/241 |
| 5,139,981 | 8/1992 | Kurland | 502/11 |
| 5,220,058 | 6/1993 | Fish et al. | 562/608 |
| 5,227,524 | 7/1993 | Jones | 562/608 |
| 5,300,685 | 4/1994 | Scates et al. | 562/608 |
| 5,344,976 | 9/1994 | Jones et al. | 562/608 |
| 5,457,230 | 10/1995 | Yang et al. | 562/608 |
| 5,576,458 | 11/1996 | Minami et al. | 562/519 |
| 5,801,279 | 9/1998 | Miura et al. | 562/608 |

*Primary Examiner*—Ivars Cintins
*Attorney, Agent, or Firm*—Thomas K. McBride; Frank S. Molinaro; Benjamin C. Spehlmann

[57] ABSTRACT

For the removal of trace quantities of iodine-containing contaminants from corrosive liquid feed streams, an adsorbent with distinct advantages over prior-art materials is provided. The treatment method involves the use of a metal phthalocyanine compound where the metal selected from the group consisting of silver, mercury, copper, lead, thallium, palladium, or mixtures thereof. Such metals are known to be reactive with the iodine-containing contaminants in the feed stream. Furthermore, the metal phthalocyanine is deposited on a carrier material selected from the group consisting of an activated carbon, a phenolic polymer, and an inorganic refractory metal oxide. Such adsorbent materials have proven substantially insoluble even in corrosive liquid feed streams associated with the invention. Reactivation and regeneration techniques, which are generally incompatible with prior-art adsorbent materials, are also disclosed.

13 Claims, No Drawings

METHOD FOR TREATING A LIQUID STREAM CONTAMINATED WITH AN IODINE-CONTAINING COMPOUND USING A SOLID ABSORBENT COMPRISING A METAL PHTHALOCYANINE

FIELD OF THE INVENTION

The present invention relates to a novel method for treating a liquid stream contaminated with an iodine-containing compound utilizing a solid adsorbent material. The adsorbent material comprises a solid carrier having deposited thereon a metal phthalocyanine compound where the metal is selected from the group consisting of silver, mercury, copper, lead, thallium, palladium or mixtures thereof.

BACKGROUND OF THE INVENTION

Methanol carbonylation, the reaction of methanol with carbon monoxide, is used to produce a significant share of the world's acetic acid and represents the basis for virtually all new acetic acid capacity. The fundamental process, whereby methanol and carbon monoxide are reacted in the presence of a rhodium catalyst and methyl iodide promoter, is disclosed in U.S. Pat. No. 3,769,329 and has become well-known as the "Monsanto process". Although numerous improvements have since been developed, the use of an iodine-containing promoter, either as an organic iodide or metal iodide salt, has proven necessary to obtain industrially-competitive reaction rates and production economies.

Unfortunately, the use of any suitable iodine-containing promoter invariably results in the incorporation of trace iodine and organic iodide impurities into the final acetic acid product. These contaminants result from numerous transformations (thermal cracking, recombination, isomerization, etc.) of the iodine-containing catalyst promoters which occur not only in the reactor but also in downstream equipment, such as distillation column reboilers and recycle lines. A resulting array of $C_1$ to $C_{10}$ organic alkyl iodide species is produced, which are removed from the acetic acid product with varying degrees of effectiveness via the standard distillation steps used in downstream purification. Additionally, iodine may be present in the acetic acid product in the form of hydrogen iodide or iodide salts. Ultimately, without supplemental treatment to remove trace iodine-containing contaminants, product acetic acid made using methanol carbonylation technology with even the most careful fractionation steps, will still contain a small amount, typically below about 100 parts per billion (ppb) of total iodine (both organic and inorganic) by weight.

The interest in a process for essentially complete removal of iodine-containing contaminants from acetic acid stems from the large share (about 40 to 50%) of its use as a precursor for vinyl acetate monomer (VAM) synthesis. Current methods of VAM production rely on a catalyst which is intolerant to even minute levels of iodine-containing compounds in the acetic acid feedstock. Therefore, the VAM production costs associated with reduced catalyst life increase dramatically with increasing feed iodine concentration.

Several disclosures in the prior art present techniques for the selective removal of iodine-containing species from process streams such as nuclear reactor containment environment off gases as well as emissions from spent nuclear fuel reprocessing operations. For example, U.S. Pat. No. 3,658,467 addresses the removal of radioactive iodine-containing materials from the gaseous waste streams generated either during normal nuclear fuel reprocessing operations or even in the event of a fuel element cladding failure whereby radioactive methyl iodide is formed in significant amounts. The solution proposed in the '467 patent is a zeolite X molecular sieve exchanged with silver for treating the gaseous waste stream. All cited examples referring to the adsorptive ability of this formulation are based on performance in a dry air stream contaminated with trace radioactive methyl iodide. The structures of X-type zeolites are known to have aluminosilicate frameworks with maximum silica to alumina molar ratios of about 3 and pore openings typically in the range of 7 to 8 Å.

In U.S. Pat. No. 4,735,786, an alternate solution for filtering radioactive iodine-containing compounds from nuclear facility exhaust gases in the event of an accident is proposed. In offering an improvement over the prior art, the '786 patent recognizes the practical deficiencies of silver-exchanged zeolite X adsorbent for this service under high humidity conditions. The improvement offered is a different type of adsorbent, characterized as a high silica to alumina molar ratio pentasil zeolite. The adsorbent specified is exemplified by the well-known ZSM-5 type material, which is clearly described in U.S. Pat. No. 3,702,886 as having ten-member rings forming medium-sized pores in the range of 5.1 to 5.6 Å. The teachings and specific examples of the '786 patent are restricted to pentasil zeolites having silica to alumina molar ratios in the range of 15 to 100, preferably 20 to 50.

In U.S. Pat. No. 4,913,850, another solution for methyl iodide removal from gaseous streams is presented, whereby a silver-exchanged "binderless" zeolite material, composed of 80 to 90% zeolite X and 10 to 20% zeolite A, is used. Among the possible candidates for zeolite X materials, those having the faujasite structure are of particular interest. As mentioned previously, zeolite X formulations generally have a maximum silica to alumina molar ratio of 3. In U.S. Pat. No. 5,075,084, the progress of treating radioactive iodine-containing gas streams is continued, where the problem of the proposed silver-exchanged zeolite material catalyzing the highly exothermic reaction of hydrogen and oxygen and, in the extreme case, causing catalytic ignition of hydrogen, is solved. According to the '084 patent, this undesired side reaction is suppressed when a heavy metal such as lead is added to the silver-exchanged adsorbent. The underlying zeolite compositions of the preferred materials in this patent and the previously-mentioned '850 patent are identical.

In U.S. Pat. No. 4,088,737, gaseous radioactive methyl iodide removal is further addressed in a multi-step treatment procedure where the initial gas purification is performed with a silver-exchanged zeolite exemplified by zeolite X. After iodine-compound breakthrough, regeneration and concentration steps are undertaken, which involve i) withdrawing the spent adsorbent from contact with the gaseous waste stream, ii) subjecting the adsorbent to desorption conditions with a hydrogen-rich stream to produce a hydrogen iodide containing off gas, and iii) treating this effluent gas with a lead-exchanged zeolite to re-adsorb and concentrate the desorbed hydrogen iodide. Lead-exchanged zeolite X is specifically cited as achieving the desired result for the final adsorption step. The advantage of the multi-step treatment is that the long-term storage of the contaminated material is less expensive for the lead-exchanged zeolite, compared to a silver-exchanged material.

In spite of these continuing developments and improvements in trace iodine and organic iodide removal from gaseous effluent streams, the methods employed have been found unsuitable for the more difficult problem of iodine-containing compound adsorption from corrosive liquids, such as commercial acetic acid product streams. Adsorbent carrier materials of the prior art such as zeolite X and zeolite A, which are classified as having low silica to alumina molar framework ratios (typically below 5), have experimentally been proven to be unstable in acetic acid. This means that the dissolution (or leaching) rate of framework components into the liquid is sufficiently large to render such materials ineffective for iodine-containing compound adsorption service in corrosive liquid media. Depending on the specific silica to alumina framework molar ratio, the pentasil zeolites, exemplified in prior art gas-phase iodine-containing compound removal using ZSM-5, are significantly more stable in acetic acid than zeolite types X and A. However, the pore sizes of pentasil zeolites, as determined by their molecular aluminosilicate crystal channel width, are too small to effectively allow passage of the straight- and branched-chain $C_3$ to $C_8$ alkyl iodides which are generally present as contaminants in commercial acetic acid product streams. In contrast, the iodine-containing compounds present in industrial nuclear power plant waste gases are normally radioactive molecular iodine and methyl iodide only.

Other teachings more specifically apply to iodine-compound removal from corrosive liquid media, where the principal area of concern, as described previously, is in the manufacture of carboxylic acids such as acetic acid via a process which results in a product stream contaminated with trace amounts of iodine-containing byproducts. Thus far, techniques such as adsorptive distillation, iodine scavenger addition, alkyl iodide oxidation to molecular iodine, and others have not achieved practical utility, because such methods not only fail to achieve the extremely low levels of iodine-containing compounds demanded industrially but also require additional purification steps. For this reason, far greater emphasis has been placed on the development of solid materials capable of adsorbing essentially all iodine-containing compounds from acetic acid streams.

For instance, in U.S. Pat. No. 5,457,230, the use of activated carbon fiber is contemplated for this purpose. However, the examples demonstrate the removal of molecular iodine and hydrogen iodide only and fail to specifically disclose the level of iodine-containing compounds in the treated acetic acid stream. In the case of iodine-compound removal from acetic acid, it is the ability of the invention to provide a treated product with only extremely minute levels of total iodine which primarily determines its practical utility. It is known in the art that activated carbon alone can neither remove iodine-containing compounds from commercial acetic acid streams to single parts per billion levels, nor can it effectively remove organic iodide species, such as methyl iodide and hexyl iodide which are commonly present in these product streams, without the use of an iodine-reactive metal.

Recently, considerable development efforts in acetic acid purification technology have focused on resins containing iodine-reactive metals such as silver, mercury, copper, lead, thallium, palladium, or combinations of these metals known to react with iodine-containing compounds to form insoluble complexes. For example, in U.S. Pat. No. 4,615,806, the removal of these impurities is achieved with a macroreticulated strong acid cation-exchange resin which is stable in the organic medium and has at least one percent of its active sites converted to the silver or mercury form, presumably by cation-exchange. The use of macroreticulated resins is claimed as an advance over the prior art formulations, which are generally characterized as gel-type ion-exchange resins, for this service. In U.S. Pat. No. 5,139,981, other silver-exchanged resins are offered, along with a novel technique for preparing such resin compositions. In U.S. Pat. No. 5,220,058, a performance benefit is claimed, whereby the subject resin contains thiol functional groups, compared to the prior art sulfonate functional groups, which are exchanged with the iodine-reactive metal. In U.S. Pat. No. 5,227,524, the resin degree of crosslinking is decreased somewhat, resulting in improved silver utilization. In U.S. Pat. No. 5,300,685, the iodine-reactive metal is coordinated, as a salt, with a polymeric resin, rather than being ionically-bound to a cation-exchange resin. In U.S. Pat. No. 5,344,976, a resin guard bed without the iodine-reactive metal is placed upstream of the metal-exchanged resin to scavenge any metal cations in the acetic acid stream which would otherwise potentially displace the iodine-reactive metal. Finally, in U.S. Pat. No. 5,801,279, an improved method of operating the iodine-compound removal step is disclosed in order to reduce the amount of leaching of the iodine-reactive metal into the treated acetic acid effluent stream. As noted in this reference, the dissolution of the iodine-reactive metal is acknowledged as a problem for iodine-compound removal techniques of the prior art whereby metal-exchanged resins are applied.

While the invention of the U.S. Pat. No. 4,615,806 patent and other modified resin-based formulations have been used commercially with some success, resins in general suffer some disadvantages, in addition to the previously-mentioned metal loss, when used in the acetic acid environment of the present invention. More specifically, resins, even those characterized as "stable" are known to "swell" or increase in diameter by as much as 50% when exposed to an organic medium, making bed design difficult. Resins are also vulnerable to decomposition at relatively mild conditions and are furthermore susceptible to chemical attack by corrosive reagents. These factors additionally complicate the use of a resin-based material for the purification of acetic acid.

Also associated with the application of resins in this service is a narrowly-limited range of acceptable operating temperatures due to decomposition, softening, loss of strength, or other detrimental structural changes resulting from thermal effects. Typically, resins begin to chemically decompose at 100 to 200° C., resulting in destruction of their fundamental networks and ion-exchange sites. For example, the preferred resin of the '806 patent is essentially a sulfonated copolymer of styrene and divinylbenzene, and at relatively mild temperatures the acid exchange sites are susceptible to acid-catalyzed desulfonation which leads to release of not only metal cations but also sulfur-containing compounds into the liquid effluent stream. Such materials interfere with further chemical processing of this product. As noted in U.S. Pat. No. 5,801,279, operation of the iodine-compound removal step in an acetic acid medium at elevated temperature is beneficial in terms of improving the rate of the desired reaction, which leads to the formation of insoluble metal iodides. However, the resin-based materials traditionally employed for the treatment of acetic acid streams are generally incompatible with high temperature operation.

The problem therefore addressed by the present invention is to provide an adsorbent for use in removing iodine-containing compounds from commercial acetic acid feed streams where the adsorbent is free of the substantial temperature restrictions, chemical exposure effects, and swelling problems associated with the typical organic materials used in the prior art. There are significant teachings in the prior art associated with the use of non-resin adsorbents that point away from their utility in this treatment service. In particular, in the comparative example recited in U.S. Pat. No. 4,615,806 (column 6, lines 36 to 49), a silver-exchanged zeolite, characterized as $\frac{1}{16}$ inch 5A molecular sieve pellets, was tested in acetic acid for contaminant methyl iodide removal and found to be unstable as evidenced by the continuous silver leaching from the adsorbent and the finding of a yellowish precipitate in the treated effluent. Given this discouraging result, it is remarkable that a suitable non-resin adsorbent for use in this corrosive environment has been discovered.

The adsorbent material is a metal phthalocyanine compound deposited on a solid carrier which is substantially insoluble in the acetic acid solution. The metal phthalocyanine compound contains any iodine-reactive metal which is capable of immobilizing the iodine-containing compound reactants onto the adsorbent. The metal phthalocyanine also contains any suitable phthalocyanine derivative, such as the sulfonate- or carboxylate-substituted forms. The solid carrier includes various well-known adsorptive materials used general as catalyst supports. Such carriers must be capable of substantially retaining the metal phthalocyanine compound during the process of treating the iodine-compound contaminated feed. Furthermore, the carrier must suffer from neither unacceptable dissolution in corrosive acetic acid feed streams nor any significant swelling or thermal degradation effects. Specific carriers which are suitable for this application include activated carbon and phenolic polymer, as well as inorganic refractory metal oxides such as silica, titania, zirconia, and others.

SUMMARY OF THE INVENTION

A primary object of the present invention is to provide a process for treating a liquid feed stream containing an iodine-containing compound comprising contacting the liquid stream with an adsorbent comprising a metal phthalocyanine compound where the metal is selected from the group consisting of silver, mercury, copper, lead, thallium, palladium, and mixtures thereof, deposited on a solid carrier at adsorption conditions effective to adsorb the iodine-containing compound on the adsorbent to yield a treated liquid stream.

A secondary object of the present invention is to provide the aforementioned process, further characterized in that the process is carried out until the adsorbent has substantially reached its adsorption capacity, at which point the adsorbent is reactivated by contacting it with a solution of a salt of a reactivation metal where the metal is selected from the group consisting of silver, mercury, copper, lead, thallium, palladium, and mixtures thereof such that an amount of reactivation metal is added to the adsorbent.

In a specific embodiment the present invention is a process for treating a liquid feed stream containing an iodine-containing compound comprising contacting the liquid stream with an adsorbent comprising a silver phthalocyanine compound deposited on an activated carbon support where the silver is present in an amount of about 1 to about 15 weight percent of the adsorbent.

Other objectives and embodiments are associated with the various preferred procedures and features connected with the invention and are discussed in the following detailed description.

DETAILED DESCRIPTION OF THE INVENTION

The feed for the process of the present invention can be broadly any liquid stream contaminated with one or more iodine-containing compounds. Typically, such feeds are produced in industrial processes which require the use of iodine-containing compounds to promote or catalyze the desired synthesis reaction. Well-documented examples of such reactions include the oxydehydrogenation of various inorganic materials to make the corresponding unsaturated compounds. Of utmost concern to the present invention, however, is the use of organic and inorganic iodine-containing promoters in the catalytic carbonylation of alcohols to yield the corresponding carboxylic acid.

In the specific case of modern methanol carbonylation technology, the iodine-containing promoter is typically methyl iodide, lithium iodide, hydrogen iodide, or, more likely, some combination of these components. The acetic acid produced, however, will normally contain a broader range of iodine-containing compounds, including traces of $C_1$ to $C_{10}$ linear and branched organic iodides as well as inorganic iodide salts of lithium and other cations either used to catalyze the reaction, formed from corrosion of the plant metallurgy, or introduced in downstream purification operations. This large variety of possible iodine-containing compounds results from the "scrambling" or recombination and rearrangement reactions of iodine-containing compounds, initially introduced as promoters, in recycle lines and processing equipment.

Normally, however, multiple distillation steps downstream of the reactor are used to separate the desired acetic acid product from unconverted reactants, catalyst promoters, and byproducts from both equilibrium and irreversible reactions. As a result of these purification measures, the predominant alkyl iodide species contaminating the acetic acid product, and thus the feed stream to the present invention, are $C_1$ to $C_8$ alkyl iodides. Also included in this feed stream are a small amount of water, generally limited to about 2000 parts per million (ppm) by weight, and trace amounts of byproduct aldehydes, alkanes, ketones, and carboxylic acids heavier than acetic acid which together normally account for less than about 100 ppm by weight of the total acetic acid stream. These other impurities do not significantly affect the ability of the present invention to remove the iodine-containing compounds. In addition to the fractionation operations themselves, the injection of methanol into the first distillation column after the carbonylation reactor is commonly employed, as taught in U.S. Pat. No. 5,576,458, to further reduce the total iodine content of the acetic acid. This is achieved through the conversion of trace hydrogen iodide to methyl iodide, which is more easily separated from acetic acid by subsequent distillation steps. Using this technique combined with fractionation, typical modern industrial methanol carbonylation plants can produce acetic acid with less than about 100 ppb by weight of total iodine contamination.

Prior to contacting the iodine-compound contaminated acetic acid feed stream with the adsorbent of the present invention, pretreatment steps of the prior art other than methanol injection and fractionation may be suitable to improve the effectiveness of trace iodine-compound removal by adsorption. For example, a an optional pretreatment that is within the scope of the present invention is described in U.S. Pat. No. 4,615,806 where a carbonaceous material is used specifically to remove hydrogen iodide and molecular iodine prior to the iodine-containing compound adsorption treatment. Particularly effective in this service are carbonaceous materials including activated carbons, wood charcoal, bone char, lignite, and others which may be impregnated with alkali metals known to increase the inorganic iodine compound chemisorption capacity. The most preferred material would be the activated carbon used as a preferred carrier material for the adsorbent of the present invention.

Another pretreatment option, as mentioned previously, is disclosed in U.S. Pat. No. 5,344,976, whereby a cation-exchange resin guard bed without any iodine-reactive metal is placed upstream of the iodine-containing compound removal adsorbent of the present invention to scavenge any metal cations, thus preventing their exposure to the adsorbent. As is well known to commercial producers of acetic acid, metal cation contamination of the product can stem from reaction catalysts and co-catalysts, corrosion of the plant metallurgy, or downstream processing operations such as neutralizing caustic injection. To effectively remove undesired cations which could otherwise potentially displace the iodine-reactive metal of the adsorbent of the present invention, a number strong acid cation exchange resins are suitable, when used in their hydrogen form. Such resins include Amberlyst 15 (available from Rohm and Haas Company, Philadelphia, Pa.) and others, as described in the '976 patent. Depending on the specific characteristics of the acetic acid feed stream, the use of either a guard bed of carbonaceous material, cation exchange resin, or both may prove beneficial for extending the practical life of the adsorbent of the present invention.

In the present invention, the novel adsorbent used to treat the iodine-compound contaminated feed is a metal phthalocyanine compound supported on a solid carrier. In preparation of this adsorbent, a metal phthalocyanine solution or dispersion is first synthesized for adsorption onto the carrier. Suitable media for providing such a solution or dispersion include water, alcohols, or carboxylic acids. Of the latter two categories of solvents, methanol and acetic acid are preferred, since they have been found to provide excellent dispersion of the active metal phthalocyanine onto the carrier. However, methanol can be undesirable for large-scale industrial manufacturing as it is relatively toxic and difficult to dispose.

As is known in the art, the metal phthalocyanine can be readily prepared from a starting solution of the solvent, a metal salt, urea, and phthalic anhydride. If, for example, water and silver nitrate are the chosen solvent and metal salt, repectively, these reactants are typically combined such that the weight ratio of water to the resulting silver phthalocyanine is about 1 to about 10. The starting solution is then heated to dissolve the solid components at a temperature of about 100° C. to about 250° C. and the adsorptive carrier material, in the form of granules, spheres, pills, pellets, or other particles of uniform or irregular size or shape, is added to the heated solution.

Dispersion of the metal phthalocyanine onto the carrier may be facilitated by any means of mechanical agitation such as stirring. Generally, at least 4 hours in the heated, agitated state are required for impregnation of the metal phthalocyanine compound onto the carrier material. Of course, this impregnation procedure can be accomplished using any suitable technique for contacting the metal phthalocyanine solution with the carrier, including dipping, soaking, suspending, or immersing the support. Otherwise the metal phthalocyanine solution may be poured over or sprayed onto the adsorbent carrier. In any case, the excess solution is separated, preferably by filtration and water washing, and the resulting composite is allowed to dry under ambient temperature conditions, or dried at an elevated temperature in an oven, or in a flow of hot gases, or in any other suitable manner.

It is generally preferable to adsorb as much metal phthalocyanine on the carrier as will form a stable composite, up to 25% of the total adsorbent weight is possible, although a lesser amount in the range of about 0.1 to about 10% by weight also affords a suitably active adsorbent. One convenient method comprises predisposing the solid support in a fixed bed and passing the metal phthalocyanine solution through the bed in order to form the adsorbent in situ. This method allows the solution to be recycled one or more times to achieve a desired concentration of the metal phthalocyanine on the carrier. In another variation of the in situ preparation, the carrier may be predisposed in the aforementioned fixed bed and soaked in the metal phthalocyanine solution for a predetermined period, thereby forming the adsorbent of the present invention useful for treating iodine-compound contaminated feed streams.

Solid carriers on which the metal phthalocyanine can be dispersed include various well-known adsorptive materials in general use as adsorbent supports. Suitable carriers are characterized as being capable of substantially retaining the metal phthalocyanine compound during the process of treating the iodine-compound contaminated feed. Furthermore, preferred carriers will not dissolve, swell, or thermally degrade to any significant extent, in corrosive acetic acid feed streams generally associated with the present invention. Specific carriers which are suitable for this application therefore include, but are not limited to, the various charcoals produced by the destructive distillation of wood, peat, lignite, nutshells, bones, and other carbonaceous matter, and preferably such charcoals as have been heat treated, chemically treated, or both, to form a highly porous particle structure of increased adsorbent capacity, and generally defined as activated charcoal. Good results have also been obtained using polymeric materials, for example GPRI 4000 (available from Georgia Pacific Resins, Inc., Decatur, Ga.) phenolic polymer, which essentially does not swell in acetic acid and can withstand temperatures up to about 200° C. without a significant rate of thermal decomposition.

Another suitable carrier of particular interest in preparing the adsorbent of the present invention is a naturally-occurring or synthetically-prepared inorganic refractory metal oxide such as silica, zirconia, titania, and mixtures thereof. Again, the main consideration in the selection of such a carrier is that it will not be adversely affected by prolonged contact with the liquid feed stream. For example, alumina would not be acceptable as a carrier for an adsorbent used to remove trace iodine-containing compounds from acetic acid, as alumina is readily dissolved in this corrosive liquid medium. Inorganic refractory metal oxide carriers are capable of withstanding temperatures, as described in U.S. Pat. No. 4,088,737, which are practical for regeneration of the adsorbent using a hot stream of regenerant gas comprising hydrogen.

The metal phthalocyanine complex, which is deposited on the solid carrier to produce the adsorbent of the present invention, is the iodine-containing compound reactive component. The metal phthalocyanine therefore includes any of the various phthalocyanine complexes of metals known to react with iodine-containing compounds and thereby form an essentially insoluble metal iodide salt, leaving the treated liquid stream with only minute concentrations, on the order of several parts per billion, of total iodine in both organic and inorganic form. Such metals include silver, mercury, copper, lead, thallium, palladium, and mixtures thereof. Silver phthalocyanine is particularly preferred.

The metal phthalocyanine can also be in the form of any of its ring-substituted derivatives, as described in U.S. Pat. No. 4,290,913, which is incorporated by reference. For example, sulfonated metal phthalocyanines (i.e. silver phthalocyanine monosulfonate, silver phthalocyanine disulfonate, or mixtures of these derivatives) may be prepared, as described in the '913 patent, by reacting the un-substituted metal phthalocyanine with fuming sulfuric acid. Likewise, the carboxylated derivatives of the phthalocyanine may also be used and are synthesized according to the '913 patent by the action of trichloroacetic acid on the metal phthalocyanine.

The treating process of the present invention is carried out at adsorption conditions which include an absolute pressure at least sufficient to maintain the feed stream as a liquid. In most cases, this operating pressure is about 0.5 to about 10 atmospheres (about 51 to about 1010 kPa), preferably about 1 to about 5 atmospheres (about 101 to about 505 kPa) at a temperature of about 20° C. to about 200° C., preferably about 30° C. to about 150° C. In general, higher temperatures improve the interaction of the iodine-containing contaminants with the reactive metal which is deposited onto the adsorbent and thereby increase the utilization of the reactive metal phthalocyanine sites. It is also noted that the adsorbent of the present invention can successfully withstand considerably higher temperatures than the resin-based adsorbent formulations of the prior art. A suitable liquid hourly space velocity (LHSV) is in the range from about 0.5 to about 15 hr$^{-1}$, preferably about 1 to about 10 hr$^{-1}$. As understood in the art, the LHSV is the hourly volumetric liquid feed flow rate divided by the adsorbent volume and represents the reciprocal of the average time of the liquid within the adsorbent bed.

After an extended period of operation in iodine-compound removal service the reactive metal is gradually converted to its metal iodide, while the metal-complexed phthalocyanine structures are concurrently changed to the un- (metal) complexed form. Electron microscopy analysis of silver-loaded adsorbents after use has indicated a migration of silver iodide molecules and subsequent agglomeration at various points on the outer surface of the carrier. As substantially all of the iodine-reactive metal is converted to metal iodide, the adsorbent gradually loses its effectiveness, so that the treated liquid stream may no longer conform to the product quality specifications demanded in terms of total iodine content. At this point, the adsorbent has substantially reached is adsorption capacity and a simple metal exchange procedure can restore activity. The technique requires subjecting the adsorbent, either in situ or ex situ, to a solution of iodine-reactive metal, preferably the same metal as deposited onto the carrier originally using metal phthalocyanine solution. The ion-exchange treatment introduces an additional portion of the active metal, which again forms a metal phthalocyanine complex, onto the adsorbent, allowing for its extended use in iodine-compound removal service. The amount of metal added in this reactivation treatment is preferably about 0.5 to about 1.5 of the amount originally deposited onto the carrier, with the specific quantity determined by the extent of deactivation of the adsorbent activity. The reactivation procedure can be repeated multiple times, thereby vastly extending the adsorbent life, until other measures are necessary to restore the iodine-containing compound adsorption capacity.

When the reactivation procedure fails to reestablish sufficient iodide removal capacity of the spent adsorbent, it is possible to free the active metal sites of the iodine-containing compounds adsorbed during iodide removal service. In the particular embodiment of the present invention whereby the adsorbent comprises a metal phthalocyanine compound deposited on a suitable inorganic refractory metal oxide carrier of the type mentioned previously, subjecting the spent adsorbent to a hot regenerant gas can restore activity. The utility of such a regeneration procedure relies on the ability of the solid inorganic refractory oxide carrier to withstand temperatures associated with this technique, as outlined in U.S. Pat. No. 4,088,737. In contrast, prior art references disclosing the use of metal-exchanged resins for the treatment of liquid acetic acid feed streams are silent regarding such regeneration procedures, since resins are sensitive to a much greater extent to thermal degradation.

When the active sites of the particular metal-oxide containing adsorbent of the present invention become so obstructed that performance suffers considerably, the exposure of this spent material to a hydrogen-containing gas stream is beneficial. Of course, as is common in industrial hydrogen streams, the gas used in the regeneration step may also comprise a mixture of hydrogen and a diluent gas selected from the group consisting of nitrogen, argon, methane, ethane, propane, and mixtures thereof. Such a treatment has proven to reduce silver to its elemental form and simultaneously liberate substantial quantities of hydrogen iodide.

As is explained in U.S. Pat. No. 4,088,737, this regeneration procedure requires a moderate pressure from about 1 to about 10 atmospheres, a high temperature from about 400° C. to about 550° C., and a gas hourly space velocity (GHSV) from about 400 to about 1000 hr$^{-1}$. This treatment generates a gas stream containing hydrogen iodide which can be either neutralized or re-adsorbed onto a cheaper adsorbent for long-term storage. Once the iodine is stripped from the adsorbent using this technique, the metallic reagent remaining in the adsorbent can be oxidized to its cationic form, which is effective for the application of the present invention. The procedure to oxidize the iodine-compound reactive metallic ingredient and to re-exchange the resulting cations with the active sites of the zeolite portion of the adsorbent are well known in the art. An oxygen-containing gas stream is often used for the oxidation procedure, and air is typically chosen for convenience. However, other oxidizing agents, such as oxygen, carbon monoxide, nitrogen oxide, and mixtures thereof are also acceptable even if they contain some impurities.

Within the scope of the present invention, it is possible to pass the treated liquid effluent, which has been depleted in iodine-containing compounds over a second bed of the carrier material which has not been impregnated with an iodine-reactive metal, or has been impregnated with the un-complexed (non-metallic) phthalocyanine. This would serve to recover or "trap" any metallic cations originally present in the first bed of the metal phthalocyanine-impregnated adsorbent which were released into the treated liquid due to displacement by hydrogen ions or metallic cation contaminants in the liquid feed stream during the adsorption step. This procedure would therefore ensure that cations released from the adsorbent during the treatment method of the present invention are retained within the system and therefore do not contaminate the effluent liquid.

It is, of course, within the scope of the present invention to periodically reverse the flow through the aforementioned two bed system to drive an active mass-transfer zone of metallic iodine-reactive cations from one bed to the other, thereby making them continually available for adsorption of the iodine-containing compounds in the liquid feed. Details associated with the operation of such a two bed system are well known to those skilled in the art. To scavenge any cations, including those used for adsorption of iodine-containing compounds, exiting with the liquid effluent of the treatment step of the present invention, it is also possible to use any suitable commercial product selective for the adsorption of cations. Especially preferred for this service are cation exchange resins such as Amberlyst 15 in the hydrogen form.

The adsorption step can be performed using a fixed-, moving-, or fluidized-bed system or a batch operation. It is preferred to employ a fixed-bed system with the iodine-containing compound contaminated liquid feed stream continually flowing through the adsorption zone of active adsorbent. Of course, the adsorption step may use a plurality of adsorption zones with the desired conditions maintained between and within the separate beds. In any case, depending on iodine-compound concentration in the liquid feed stream, the operating conditions of the adsorption step can be manipulated to achieve an effluent liquid stream containing less than about 10 ppb by weight of total iodine, calculated on an elemental basis, and preferably less than about 5 ppb by weight. Regarding the mechanics of the operation, it is possible to use swing-bed systems of the prior art to alternate beds of adsorbent between the adsorption, reactivation, and regeneration steps of the present invention.

The following examples illustrate the benefits and advantages associated with the present invention and contrast it with the prior art, particularly in the case where the use of non-resin based adsorbents similar to the type of the present invention was attempted but did not yield satisfactory results. While these examples are provided to illustrate the present invention, they are not intended to limit it.

COMPARATIVE EXAMPLE 1

The Comparative Example III of U.S. Pat. No. 4,615,806 (column 6, lines 35 to 49), is incorporated by reference. According to this comparative example, an attempt was made to remove methyl iodide from an essentially pure acetic acid stream utilizing 50 ml of 1/16 inch (1.6 mm) particle size 5A molecular sieve pellets. This non-resin carrier material contained unspecified amounts of zeolite A which had been ion-exchanged with silver from a silver nitrate solution. A synthetic solution of 0.865% methyl iodide in acetic acid was then passed over this bed of silver-exchanged 5A molecular sieve particles at apparently ambient temperature and pressure at an LHSV of 1 $hr^{-1}$. Continuous leaching of silver was noted, along with the formation of a yellowish precipitate in the treated acetic acid effluent, which was believed to be silver iodide. These results would imply that breakthrough of the methyl iodide occurred very quickly and therefore that performance was unacceptable.

EXAMPLE 1

A sample of silver phthalocyanine-loaded adsorbent was prepared according to the following procedure:

A mixture of 1.0 grams of silver nitrate, 3.0 grams urea, 3.6 grams of phthalic anhydride, and 20 grams of deionized water were added to a 400 ml beaker. The beaker was then covered with aluminum foil and placed into an oven where the solid components of the mixture were dissolved at 200° C. over a period of 20 minutes. Thereafter, 15 grams (20 ml) of 20×50 U.S. mesh Calgon (Pittsburgh, Pa. USA) type OL carbon were added to the liquid and the mixture was stirred for 10 minutes. The slurry was maintained at 200° C. for 4.5 hours. The solid product was recovered, allowed to cool to ambient temperature, and washed with about 100 ml of deionized water. The solid was then dried for 8 hours at 90° C. to yield the adsorbent, which was found to contain 3.4% silver by weight, using Atomic Adsorption Spectroscopy (AAS) analysis.

The 20 ml adsorbent sample was loaded into a 10 mm i.d. vessel and contacted with a feed stream comprising acetic acid contaminated initially with 348 ppb by weight of methyl iodide. The operating conditions were 60° C., 3.3 $hr^{-1}$ LHSV, and atmospheric pressure. In order to accelerate the breakthrough of methyl iodide and thereby allow for a determination of adsorptive capacity within a reasonable time frame, the feed methyl iodide concentration was increased during the experiment in several steps to 847 ppm by weight. The liquid effluent stream was periodically analyzed for organic iodide using gas chromatography (GC) equipped with an Electron Capture Detector (ECD). Results showed that the iodine level in the treated liquid stream was below the 1 weight ppb detection limit of the analyzer capability for the first 400 ml of effluent. The calculated iodine-compound removal capacity of this adsorbent was 12.3 mg iodine per milliliter of adsorbent.

What is claimed is:

1. A process for treating a liquid feed stream containing an iodine-containing compound comprising contacting the liquid stream with an adsorbent comprising a solid carrier having deposited thereon a metal phthalocyanine compound where the metal is selected from the group consisting of silver, mercury, copper, lead, thallium, palladium, and mixtures thereof, at adsorption conditions effective to adsorb the iodine-containing compound on the adsorbent to yield a treated liquid stream.

2. The process of claim 1 where the solid carrier is selected from the group consisting of an activated carbon, a phenolic polymer, and an inorganic refractory metal oxide.

3. The process of claim 2 where the inorganic metal oxide is selected from the group consisting of silica, zirconia, titania, and mixtures thereof.

4. The process of claim 3 where the process is carried out until the adsorbent has substantially reached its adsorption capacity, at which point the adsorbent is contacted with a regenerant gas stream comprising hydrogen at conditions effective to strip substantially all of the adsorbed iodine as hydrogen iodide to yield a regenerated adsorbent.

5. The process of claim 4 where the regenerant gas stream comprises hydrogen and a diluent gas selected from the group consisting of nitrogen, argon, methane, ethane, propane, and mixtures thereof.

6. The process of claim 4 where the regenerated adsorbent is treated with an oxidizing gas such that the metal is oxidized.

7. The process of claim 6 where the oxidizing gas is selected from the group consisting of oxygen, air, carbon monoxide, nitrogen oxide, and mixtures thereof.

8. The process of claim 1 where the metal is silver and is present, on an elemental basis, in an amount from about 1 to about 15 weight percent of the adsorbent.

9. The process of claim 1 where the iodine-containing compound is an alkyl iodide having 1 to 8 carbon atoms.

10. The process of claim 1 where the adsorption conditions include a temperature from about 30° C. to about 150° C., a pressure from about 1 to about 5 atmospheres, and a liquid hourly space velocity from about 1 to about 10 $hr^{-1}$.

11. The process of claim 1 where the treated liquid stream contains less than about 5 parts per billion of total iodine by weight.

12. The process of claim 1 where the liquid feed stream comprises an acetic acid feed stream.

13. The process of claim 1 where the process is carried out until the adsorbent has substantially reached its adsorption capacity, at which point the adsorbent is reactivated by contacting it with a solution of a salt of a reactivation metal where the metal is selected from the group consisting of silver, mercury, copper, lead, thallium, palladium, and mixtures thereof such that an amount of reactivation metal is added to the adsorbent.

* * * * *